US012658434B2

(12) United States Patent
Baek et al.

(10) Patent No.: US 12,658,434 B2
(45) Date of Patent: Jun. 16, 2026

(54) POSITIVE ELECTRODE ACTIVE MATERIAL FOR LITHIUM SECONDARY BATTERY AND METHOD OF PREPARING THE POSITIVE ELECTRODE ACTIVE MATERIAL

(71) Applicant: LG Energy Solution, Ltd., Seoul (KR)

(72) Inventors: So Ra Baek, Daejeon (KR); Gi Beom Han, Daejeon (KR); Sang Wook Lee, Daejeon (KR); Hak Yoon Kim, Daejeon (KR); Jung Min Han, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 957 days.

(21) Appl. No.: 17/778,475

(22) PCT Filed: Dec. 4, 2020

(86) PCT No.: PCT/KR2020/017599
§ 371 (c)(1),
(2) Date: May 20, 2022

(87) PCT Pub. No.: WO2021/112606
PCT Pub. Date: Jun. 10, 2021

(65) Prior Publication Data
US 2022/0416238 A1　　Dec. 29, 2022

(30) Foreign Application Priority Data
Dec. 5, 2019　(KR) ........................ 10-2019-0160667

(51) Int. Cl.
| | |
|---|---|
| *H01M 4/00* | (2006.01) |
| *C01G 53/50* | (2025.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ............ *H01M 4/525* (2013.01); *C01G 53/50* (2013.01); *H01M 4/364* (2013.01); *H01M 4/505* (2013.01); *C01P 2002/54* (2013.01); *C01P 2002/60* (2013.01); *C01P 2004/50* (2013.01); *C01P 2004/53* (2013.01); *C01P 2004/61* (2013.01); *C01P 2004/62* (2013.01); *C01P 2006/40* (2013.01); *H01M 2004/021* (2013.01); *H01M 2004/028* (2013.01)

(58) Field of Classification Search
CPC ...... H01M 4/525; H01M 4/364; H01M 4/505; H01M 2004/021; H01M 2004/028; C01G 53/50; C01P 2002/54; C01P 2002/60; C01P 2004/50; C01P 2004/53; C01P 2004/61; C01P 2004/62; C01P 2006/40
See application file for complete search history.

(56) References Cited

U.S. PATENT DOCUMENTS

| | | | |
|---|---|---|---|
| 10,147,943 B2 | 12/2018 | Maeda et al. | |
| 11,063,250 B2 | 7/2021 | Choi et al. | |
| 2001/0010807 A1 | 8/2001 | Matsubara | |
| 2006/0073387 A1 | 4/2006 | Sakagoshi et al. | |
| 2012/0177994 A1 | 7/2012 | Kim et al. | |
| 2012/0258366 A1 | 10/2012 | Yu et al. | |
| 2015/0380737 A1 | 12/2015 | Kawasato et al. | |
| 2016/0126547 A1 | 5/2016 | Koga et al. | |
| 2016/0218362 A1 | 7/2016 | Kagei et al. | |
| 2017/0155139 A1 | 6/2017 | Feng et al. | |
| 2018/0048015 A1 | 2/2018 | Lee et al. | |
| 2018/0287135 A1 | 10/2018 | Shin et al. | |
| 2019/0027782 A1* | 1/2019 | Tamura ................ H01M 4/525 |
| 2019/0190018 A1 | 6/2019 | Aoki et al. | |
| 2020/0343549 A1 | 10/2020 | Hiratsuka | |
| 2020/0403239 A1 | 12/2020 | Sun et al. | |
| 2020/0403240 A1 | 12/2020 | Sun | |
| 2022/0059836 A1 | 2/2022 | Hiratsuka et al. | |
| 2022/0416238 A1 | 12/2022 | Baek et al. | |
| 2023/0140577 A1 | 5/2023 | Nam et al. | |

FOREIGN PATENT DOCUMENTS

| | | |
|---|---|---|
| CN | 1232438 A | 10/1999 |
| CN | 109713297 A | 5/2019 |
| CN | 109817955 A | 5/2019 |
| CN | 111771303 A | 10/2020 |
| CN | 113272999 A | 8/2021 |
| EP | 0918041 B1 | 11/2010 |
| EP | 3734720 A1 | 11/2020 |
| EP | 3905391 A1 | 11/2021 |
| JP | 2001048545 A | 2/2001 |

(Continued)

OTHER PUBLICATIONS

Extended European Search Report for Application No. 20895599.7 dated Nov. 22, 2022. 7 pgs.
International Search Report for PCT/KR2020/017599 dated Mar. 11, 2021. 3 pgs.
Jouanneau, S. et al., "Effect of the Sintering Agent, B2O3 , on Li[NixCo1A2xMnx]O2 Materials", Journal of The Electrochemical Society, Oct. 2004, pp. A1789-A1796, vol. 151, No. 11.
Sun, Zhenhe et al., "Enhanced cycling stability of boron-doped lithium-rich layered oxide cathode materials by suppressing transition metal migration", Journal of Materials Chemistry A(Jul. 2019). 9 pgs.

*Primary Examiner* — Nicholas P D'Aniello

(74) *Attorney, Agent, or Firm* — Lerner David LLP

(57) ABSTRACT

A positive electrode active material includes a lithium transition metal oxide, which is in the form of a secondary particle formed by aggregation of primary particles and is represented by Formula 1, wherein the lithium transition metal oxide has a crystalline size of 160 nm or less and an average particle diameter of the primary particle of 0.6 µm or more. A preparation method thereof is also provided.

9 Claims, No Drawings

(56)     References Cited

FOREIGN PATENT DOCUMENTS

| JP | 2005044775 | A  | 2/2005  |
|----|------------|----|---------|
| JP | 4131521    | B2 | 8/2008  |
| JP | 4756189    | B2 | 8/2011  |
| JP | 2013206553 | A  | 10/2013 |
| JP | 2016026981 | A  | 2/2016  |
| JP | 2019192325 | A  | 10/2019 |
| KR | 20120081808 | A | 7/2012  |
| KR | 101373094  | B1 | 3/2014  |
| KR | 20160055138 | A | 5/2016  |
| KR | 20170038485 | A | 4/2017  |
| KR | 20170063395 | A | 6/2017  |
| KR | 20190032119 | A | 3/2019  |
| KR | 20190055700 | A | 5/2019  |
| KR | 102004457  | B1 | 7/2019  |
| KR | 20190078498 | A | 7/2019  |
| KR | 20190081609 | A | 7/2019  |
| KR | 20190086403 | A | 7/2019  |
| KR | 20210070933 | A | 6/2021  |
| WO | 2014077231 | A1 | 5/2014  |
| WO | 2016006557 | A1 | 1/2016  |
| WO | 2018043189 | A1 | 3/2018  |
| WO | 2018043190 | A1 | 3/2018  |
| WO | 2019139445 | A1 | 7/2019  |
| WO | 2019167582 | A1 | 9/2019  |
| WO | 2020137296 | A1 | 7/2020  |

* cited by examiner

POSITIVE ELECTRODE ACTIVE MATERIAL FOR LITHIUM SECONDARY BATTERY AND METHOD OF PREPARING THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2020/017599, filed on Dec. 4, 2020, which claims priority from Korean Patent Application No. 10-2019-0160667, filed on Dec. 5, 2019, the disclosures of which are incorporated by reference herein.

TECHNICAL FIELD

The present invention relates to a positive electrode active material for a lithium secondary battery, a method of preparing the positive electrode active material, and a positive electrode and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al, has been developed.

However, since the lithium transition metal oxide substituted with Co, Mn, or Al as described above still has poor thermal stability, there was a problem in that high-temperature life characteristics and storage characteristics were poor when the lithium transition metal oxide was used in a battery.

Thus, there is a need to develop a positive electrode active material which may improve thermal stability to improve life characteristics and storage characteristics at high temperatures.

PRIOR ART DOCUMENTS (Patent Document 1) Korean Patent No. 10-2004457

DISCLOSURE OF THE INVENTION

Technical Problem

An aspect of the present invention provides a positive electrode active material in which high-temperature life characteristics and high-temperature storage characteristics may be improved by controlling a primary particle size and a crystallite size.

Another aspect of the present invention provides a method of preparing the positive electrode active material.

Another aspect of the present invention provides a positive electrode including the positive electrode active material.

Another aspect of the present invention provides a lithium secondary battery including the positive electrode.

Technical Solution

According to an aspect of the present invention, there is provided a positive electrode active material which includes a lithium transition metal oxide which is in the form of a secondary particle formed by aggregation of primary particles and is represented by Formula 1, wherein the lithium transition metal oxide has a crystalline size of 160 nm or less and an average particle diameter of the primary particle of 0.6 μm or more.

$$Li_{1+a}Ni_xCo_yM^1_zB_wO_2 \qquad \text{[Formula 1]}$$

In Formula 1, $M^1$ includes at least one of manganese (Mn) or aluminum (Al), and $0 \leq a \leq 0.5$, $0.5 \leq x < 1.0$, $0 < y \leq 0.4$, $0 < z \leq 0.4$, and $0 < w \leq 0.1$.

According to another aspect of the present invention, there is provided a method of preparing a positive electrode active material which includes: preparing a transition metal hydroxide precursor; and mixing the transition metal hydroxide precursor, a lithium raw material, and a boron (B)-containing raw material and sintering at 760° C. to 840° C. to prepare a boron (B)-doped lithium transition metal oxide, wherein the boron (B)-doped lithium transition metal oxide is represented by Formula 1 and has a crystalline size of 160 nm or less and an average particle diameter of primary particles of 0.6 μm or more.

According to another aspect of the present invention, there is provided a positive electrode for a lithium secondary battery which includes the positive electrode active material.

According to another aspect of the present invention, there is provided a lithium secondary battery including the positive electrode for a lithium secondary battery.

Advantageous Effects

In a preparation method of the present invention, since boron is doped and sintering is performed at a specific temperature during preparation of a lithium transition metal oxide, a crystallite size of the lithium transition metal oxide is small and large primary particles may be formed.

A positive electrode active material including the lithium transition metal oxide of the present invention, in which the crystallite size and primary particle size are controlled as described above, exhibits excellent high-temperature life characteristics, high-temperature storage characteristics, and gas generation characteristics when it is used in a secondary battery.

BEST MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the expression "crystalline" means a single crystal unit having a regular atomic arrangement. A size of the crystalline may be measured by analyzing X-ray diffraction (XRD) data, which are obtained by X-ray diffraction analysis of positive electrode active material powder, using a Rietveld refinement method. In this case, the X-ray diffraction analysis was performed using a Bruker $D_8$ Endeavor (Cu-K$\alpha$, $\lambda$=1.54 Å) equipped with a LynxEye XE-T-position sensitive detector, wherein a sample was put in a groove of a holder for general powder, a surface of the sample was leveled using a slide glass, the sample was filled so that a sample height matched an edge of the holder, and measurement was then made using a fixed divergence slit (FDS) of 0.5° and a $2\theta$ range of 15° to 90° under conditions in which a step size=0.02° and total scan time=about 20 minutes.

Rietveld refinement was performed for the measured data in consideration of charge at each site (metals at transition metal sites were +3, Ni at a Li site was +2) and cation mixing. Specifically, instrumental broadening during the size analysis of the crystalline was considered by using Fundamental Parameter Approach (FPA) built into a Bruker TOPAS program, and entire peaks in the measurement range were used during fitting. A peak shape was fitted using only Lorentzian contribution as first principle (FP) among peak types available in the TOPAS, and strain was not considered.

In the present invention, the expression "primary particle" denotes a smallest particle unit which is distinguished as one body when a cross section of a positive electrode active material is observed through a scanning electron microscope (SEM), wherein it may be composed of a single grain, or may also be composed of a plurality of grains. In the present invention, an average particle diameter of the primary particle was measured by measuring a size of each particle distinguished from a cross-sectional SEM image of the positive electrode active material particles, and then calculating an arithmetic average value thereof.

In the present invention, the expression "secondary particle" denotes a secondary structure formed by aggregation of a plurality of primary particles. An average particle diameter of the secondary particle may be measured using a particle size analyzer, and, in the present invention, Microtrac S3500 was used as the particle size analyzer.

The expression "particle diameter $D_n$" of the positive electrode active material in the present invention denotes a particle diameter at n % of cumulative distribution of volume according to the particle diameter. That is, $D_{50}$ is a particle diameter at 50% of the cumulative distribution of volume according to the particle diameter, $D_{90}$ is a particle diameter at 90% of the cumulative distribution of volume according to the particle diameter, and $D_{10}$ is a particle diameter at 10% of the cumulative distribution of volume according to the particle diameter. The $D_n$ may be measured by using a laser diffraction method. Specifically, after dispersing measurement target powder in a dispersion medium, the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The $D_{10}$, $D_{50}$, and $D_{90}$ may be measured by calculating particle diameters at 10%, 50%, and 90% of the cumulative distribution of volume according to the particle diameter using the measurement instrument.

Positive Electrode Active Material

The present inventors have found that high-temperature life characteristics, high-temperature storage characteristics, and gas generation characteristics of a positive electrode active material may be improved by controlling a primary particle size and a crystalline size of a lithium transition metal oxide to specific ranges.

The positive electrode active material according to an embodiment of the present invention includes a lithium transition metal oxide which is in the form of a secondary particle formed by aggregation of primary particles, and has a crystalline size of 160 nm or less and an average particle diameter of the primary particle of 0.6 μm or more.

In this case, the lithium transition metal oxide may be a lithium transition metal oxide doped with boron (B) in which a molar ratio of nickel to a total number of moles of transition metals is 50 mol % or more, for example, 60 mol % or more.

Preferably, the lithium transition metal oxide may be represented by Formula 1 below:

$$Li_{1+a}Ni_xCo_yM^1_zB_wO_2 \qquad \text{[Formula 1]}$$

In Formula 1, $M^1$ may be at least one of manganese (Mn) and aluminum (Al), and may preferably be Mn or a combination of Mn and Al.

1+a represents a molar ratio of lithium in the lithium transition metal oxide, wherein a may satisfy 0≤a≤0.5, may preferably satisfy 0≤a≤0.2, and may more preferably satisfy 0≤a≤0.1.

x represents a molar ratio of nickel among total transition metal elements in the lithium transition metal oxide, wherein x may satisfy 0.5≤x<1.0, may preferably satisfy 0.6≤x≤0.98, and may more preferably satisfy 0.6≤x≤0.95.

y represents a molar ratio of cobalt among the total transition metal elements in the lithium transition metal oxide, wherein y may satisfy 0<y≤0.4, may preferably satisfy 0<y≤0.3, and may more preferably satisfy 0.05≤y≤0.3.

z represents a molar ratio of $M^1$ element among the total transition metal elements in the lithium transition metal oxide, wherein z may satisfy 0<z≤0.4, may preferably satisfy 0<z≤0.3, and may more preferably satisfy 0.01≤z≤0.3.

w represents a molar ratio of boron in the lithium transition metal oxide, wherein w may satisfy 0<w≤0.1, may preferably 0<w≤0.05, and may more preferably satisfy 0<w≤0.02.

The lithium transition metal oxide according to the present invention may be prepared by mixing a positive electrode active material precursor, a lithium raw material, and a boron-containing raw material and then sintering the mixture. In a case in which the boron-containing raw material is added during the sintering, since boron (B) reduces a reaction temperature between the positive electrode active material precursor and the lithium raw material, the sintering may be performed at a relatively low temperature and grain growth is suppressed due to the low sintering temperature, and thus, a lithium transition metal oxide having a small crystalline size may be obtained. Also, in a case in which the boron (B) is present during the sintering as described above, since the boron acts as a catalyst for accelerating the reaction between the positive electrode active material precursor and the lithium raw material to promote primary particle growth, a lithium transition metal oxide having a larger primary particle size than a positive electrode active material prepared without adding boron under the same sintering conditions may be obtained.

Specifically, in an embodiment of the present invention, the lithium transition metal oxide may have an average particle diameter of the primary particle of 0.6 μm or more, preferably 0.6 μm to 1.3 μm, and more preferably 0.6 μm to 1.0 μm. When the average particle diameter of the primary particle satisfies the above range, since particle breakage during preparation of a positive electrode or a charge and discharge process of a battery is suppressed, degradation of high-temperature storage characteristics caused by fine powder in the positive electrode and generation of a large amount of gas may be effectively suppressed.

Also, in another embodiment of the present invention, the lithium transition metal oxide may have a crystalline size of 160 nm or less, for example, 100 nm to 160 nm. When the crystalline size of the lithium transition metal oxide satisfies the above-described range, since generation of cracks in the positive electrode active material, which occurs during the charge and discharge process, is minimized to increase capacity retention according to the progression of cycles and to suppress a resistance increase rate, high-temperature life characteristics may be improved.

Furthermore, the lithium transition metal oxide may be in the form of a secondary particle which is formed by aggregation of primary particles.

In a case in which the positive electrode active material includes the lithium transition metal oxide in the form of a secondary particle as described above, since a contact area between the positive electrode active material and an electrolyte solution is increased and a distance of lithium ions in the positive electrode active material is decreased, high capacity and high output characteristics may be achieved.

Also, the positive electrode active material may include boron (B) in an amount of 0.02 part by weight to 0.3 part by weight, for example, 0.05 part by weight to 0.2 part by weight based on 100 parts by weight of the lithium transition metal oxide represented by Formula 1. In a case in which the boron (B) is included in the above-described range, the average particle diameter of the primary particles of the lithium transition metal oxide may be controlled to a desired range without a reduction in energy density. In a case in which the amount of the boron (B) doped is less than the above-described range, since growth of the primary particle is insignificant, the fine powder due to the particle breakage during the preparation of the positive electrode or the charge and discharge process of the battery is likely to occur, and, as a result, the high-temperature storage characteristics are degraded and a large amount of gas may be generated when used in the battery to cause a swelling phenomenon. In contrast, in a case in which the amount of the boron (B) is greater than the above-described range, the energy density of the positive electrode active material may be decreased due to the addition of an excessive amount of the doping element.

In an embodiment of the present invention, the positive electrode active material may include two types of lithium transition metal oxides having different average particle diameters $D_{50}$ of secondary particles. That is, the positive electrode active material according to an embodiment of the present invention may have a bimodal particle diameter distribution including a large-particle-diameter lithium transition metal oxide having a large average particle diameter $D_{50}$ of a secondary particle and a small-particle-diameter lithium transition metal oxide having a small average particle diameter $D_{50}$ of a secondary particle. The large-particle-diameter lithium transition metal oxide and the small-particle-diameter lithium transition metal oxide may each independently have a composition represented by Formula 1, and the compositions of the large-particle-diameter lithium transition metal oxide and the small-particle-diameter lithium transition metal oxide may be the same or different from each other, but it is more desirable that the compositions of the large-particle-diameter lithium transition metal oxide and the small-particle-diameter lithium transition metal oxide are the same.

The average particle diameter ($D_{50}$) of the secondary particle of the large-particle-diameter lithium transition metal oxide may be in a range of 7 μm to 20 μm, preferably 8 μm to 18 μm, and more preferably 8 μm to 16 μm, and the average particle diameter ($D_{50}$) of the secondary particle of the small-particle-diameter lithium transition metal oxide may be in a range of 1 μm to 7 μm, preferably 3 μm to 7 μm, and more preferably 3 μm to 6 μm. In a case in which the positive electrode active material having a bimodal particle diameter distribution as described above is used, a positive electrode having high electrode density and energy density may be formed.

Method of Preparing Positive Electrode Active Material

Next, a method of preparing a positive electrode active material according to the present invention will be described.

The method of preparing a positive electrode active material according to the present invention includes the steps of: (1) preparing a transition metal hydroxide precursor and (2) mixing the transition metal hydroxide precursor, a lithium raw material, and a boron (B)-containing raw material and sintering at 760° C. to 840° C. to prepare a boron (B)-doped lithium transition metal oxide.

In this case, the boron (B)-doped lithium transition metal oxide is a lithium transition metal oxide which is represented by Formula 1 and has a crystalline size of 160 nm or less and an average particle diameter of primary particles of 0.6 μm or more. Since the lithium transition metal oxide is the same as described above, a detailed description thereof will be omitted.

Hereinafter, the method of preparing a positive electrode active material according to the present invention will be described in more detail.

First, a transition metal hydroxide precursor is prepared (first step).

In this case, the transition metal hydroxide precursor may be a transition metal hydroxide including nickel, cobalt, and a metal element $M^1$ (where, $M^1$ includes at least one of Mn or Al), and may be a transition metal hydroxide in which a molar ratio of nickel to a total number of moles of transition metals in the transition metal hydroxide is 50 mol % or more, for example, 60 mol % or more.

The transition metal hydroxide precursor may be used by purchasing a commercially available precursor for a positive electrode active material, or may be prepared according to a method of preparing a precursor for a positive electrode active material which is well known in the art.

Preferably, the transition metal hydroxide precursor may be one represented by Formula 2 below.

$$Ni_{x1}Co_{y1}M^1_{z1}(OH)_2 \qquad \text{[Formula 2]}$$

In Formula 2, $M^1$ may include at least one of Mn or Al.

x1 may satisfy $0.5 \leq x1 < 1.0$, may preferably satisfy $0.6 \leq x1 \leq 0.98$, and may more preferably satisfy $0.6 \leq x1 \leq 0.95$.

y1 may satisfy $0 < y1 \leq 0.4$, may preferably satisfy $0 < y1 \leq 0.3$, and may more preferably satisfy $0.05 \leq y1 \leq 0.3$.

z1 may satisfy $0 < z1 \leq 0.4$, may preferably satisfy $0 < z1 \leq 0.3$, and may more preferably satisfy $0.01 \leq z1 \leq 0.3$.

In this case, x1, y1, and z1 may satisfy $x1+y1+z1=1$.

Subsequently, the transition metal hydroxide precursor, a lithium raw material, and a boron (B)-containing raw material are mixed and sintered at 760° C. to 840° C. to prepare a boron (B)-doped lithium transition metal oxide (second step).

As the boron (B)-containing raw material, sulfate, nitrate, acetic acid salt, halide, hydroxide, or oxyhydroxide containing boron (B) may be used, and any boron (B)-containing raw material may be used without particularly limitation as long as it may be dissolved in a solvent such as water. Specifically, the boron (B)-containing raw material may be $H_3BO_3$, $B_2O_3$, $B_4C$, $BF_3$, $(C_3H_7O)_3B$, $(C_6H_5O)_3B$, $[CH_3(CH_2)_3O]_3B$, $C_{13}H_{19}O_3$, $C_6H_5B(OH)_2$, $B_2F_4$, or a combination thereof, but is not limited thereto.

Also, the lithium raw material may be used without particular limitation as long as it is a compound including a lithium source, but, preferably, at least one selected from the group consisting of lithium carbonate ($Li_2CO_3$), lithium hydroxide ($LiOH.H_2O$), $LiNO_3$, $CH_3COOLi$, and $Li_2(COO)_2$ may be used.

The transition metal hydroxide precursor and the boron (B)-containing raw material may be mixed in amounts such that a total number of moles of transition metals:a number of moles of boron is in a range of 0.97:0.03 to 0.998:0.002, for example, 0.975:0.025 to 0.995:0.005.

Also, the lithium raw material may be mixed in an amount such that a ratio of a number of moles of lithium to a total number of moles of the transition metals and the boron, that is, (the number of moles of the lithium (Li)/(the number of moles of the transition metals+the number of moles of the boron)) is in a range of 1.0 to 1.2, preferably 1.0 to 1.1, and more preferably 1.01 to 1.08.

When a mixing ratio of the transition metal hydroxide, the boron-containing raw material, and the lithium raw material satisfies the above range, the primary particle size and the crystalline size may be controlled within a desired range.

Next, a mixture of the transition metal hydroxide, the lithium raw material, and the boron-containing raw material is sintered.

In this case, sintering temperature may be in a range of 760° C. to 840° C., for example, 760° C. to 800° C.

In a case in which a sintering process is performed in the above-described temperature range, since crystal growth is suppressed due to the relatively low sintering temperature, a positive active material having a crystalline size of 160 nm or less, for example, 100 nm to 160 nm may be synthesized. In addition, since the particle of the positive electrode active material grows densely due to the low sintering temperature, particle strength may be improved to suppress the particle breakage of the positive electrode active material during the preparation of the positive electrode or the charge and discharge process of the battery.

In contrast, in a case in which the sintering process is performed at a temperature of greater than 840° C., the crystalline size of the positive electrode active material may be increased beyond the range of the present invention due to over-sintering in which the particles grow disproportionately. In this case, since a change in volume of a unit lattice, which occurs during the charge and discharge process, is greater than that of the positive electrode active material satisfying the crystalline size of the present invention and, as a result, the generation of cracks in the positive electrode active material according to the progression of cycles increases, the high-temperature life characteristics may be degraded.

The sintering may be performed for 15 hours to 30 hours, for example, 17 hours to 25 hours. When sintering time satisfies the above range, a lithium transition metal oxide having desired average particle diameter of the primary particle and crystalline size may be prepared. If the sintering time is too short, the primary particle may not sufficiently grow, and, if the sintering time is too long, the crystalline may grow excessively large.

According to the preparation method of the present invention, since the growth of the primary particles of the positive electrode active material is promoted by the B even if the sintering temperature is reduced during the preparation of the positive electrode active material by the boron (B) contained in the boron (B)-containing raw material, a lithium transition metal oxide having an average particle diameter of the primary particle of 0.6 μm or more may be prepared even if the sintering is performed at a relatively low sintering temperature.

In general, when a high Ni-containing transition metal hydroxide precursor containing nickel (Ni) in an amount of 50 mol % or more based on a total number of moles of transition metals and a lithium raw material (e.g., $LiOH.H_2O$) are mixed and sintered, a reaction with the transition metal hydroxide precursor starts at the time of melting of lithium, wherein, in this case, since a melting point of the $LiOH.H_2O$ is about 400° C., the transition metal hydroxide precursor and the lithium react above 400° C. However, since the B may react with lithium (Li) at about 150° C., the B and the Li react at 150° C. and the B may also act as a catalyst when the Li and the transition metal hydroxide precursor react above 450° C. Accordingly, since the reaction temperature between the Li and the transition metal hydroxide precursor is reduced, the growth of primary particles of a positive electrode active material is promoted by the B even if sintering is performed at a temperature lower than a sintering temperature of a mixture of atypical transition metal hydroxide precursor containing a high nickel content and a lithium raw material, when the B is used, and thus, a lithium transition metal oxide having a relatively large average particle diameter of the primary particles may be obtained.

Thus, according to the preparation method of the present invention in which the boron-containing raw material is added during sintering and the sintering is performed at a specific temperature, a lithium transition metal oxide having an average particle diameter of the primary particle of 0.6 μm or more and a crystalline size of 160 nm or less may be prepared.

Positive Electrode

Also, the present invention provides a positive electrode for a lithium secondary battery which includes the above-described positive electrode active material.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between positive electrode active material particles and the adhesion between positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a positive electrode material mixture, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the positive electrode material mixture and manufacturing yield, and may allow to have a viscosity that may provide excellent thickness uniformity during the subsequent coating for the preparation of the positive electrode.

Also, as another method, the positive electrode may be prepared by casting the positive electrode material mixture on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber, a nitrile-butadiene rubber, a fluorine rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

MODE FOR CARRYING OUT THE INVENTION

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLE 1

A precursor represented by $Ni_{0.6}Co_{0.2}Mn_{0.2}(OH)_2$, $LiOH.H_2O$, and $H_3BO_3$ were mixed such that a molar ratio of transition metal (Me):Li:B was 0.97:1.02:0.03, and a heat treatment was performed at 780° C. for 23 hours to prepare a B-doped positive electrode active material.

EXAMPLE 2

A positive electrode active material was prepared in the same manner as in Example 1 except that the heat treatment was performed at 790° C.

COMPARATIVE EXAMPLE 1

A positive electrode active material was prepared in the same manner as in Example 1 except that the heat treatment was performed at 750° C.

COMPARATIVE EXAMPLE 2

A positive electrode active material was prepared in the same manner as in Example 1 except that the heat treatment was performed at 850° C.

COMPARATIVE EXAMPLE 3

A precursor represented by $Ni_{0.6}Co_{0.2}Mn_{0.2}(OH)_2$ and $LiOH.H_2O$ were mixed such that a molar ratio of transition metal (Me):Li was 1:1.02, and a heat treatment was performed at 740° C. for 23 hours to prepare a positive electrode active material.

COMPARATIVE EXAMPLE 4

A precursor represented by $Ni_{0.6}Co_{0.2}Mn_{0.2}(OH)_2$ and $LiOH.H_2O$ were mixed such that a molar ratio of transition metal (Me):Li was 1:1.02, and a heat treatment was performed at 850° C. for 23 hours to prepare a positive electrode active material.

COMPARATIVE EXAMPLE 5

A precursor represented by $Ni_{0.6}Co_{0.2}Mn_{0.2}(OH)_2$, $LiOH.H_2O$, and $H_3BO_3$ were mixed such that a molar ratio of transition metal (Me):Li:B was 0.92:1.02:0.08, and a heat treatment was performed at 780° C. for 23 hours to prepare a B-doped positive electrode active material.

EXPERIMENTAL EXAMPLE 1

Confirmation of Characteristics of Positive Electrode Active Material Particles (1) Average Particle Diameter of Primary Particles of Positive Electrode Active Material Average particle diameters of primary particles of the positive electrode active materials prepared in Examples 1 and 2 and Comparative Examples 1 to 5 were measured.

Specifically, cross-sectional images of the positive electrode active materials prepared in Examples 1 and 2 and Comparative Examples 1 to 5 were observed using a scanning electron microscope, and, after diameters of 100 primary particles in a cross-section of each positive electrode active material were measured, an arithmetic average value thereof was measured as the average particle diameter of the primary particles. Measurement results are presented in [Table 1] below.

(2) Crystalline Size of Positive Electrode Active Material

Crystalline sizes of the primary particles of the positive electrode active materials prepared in Examples 1 and 2 and Comparative Examples 1 and 2 were measured.

Specifically, X-ray diffraction analysis was performed using a Bruker $D_8$ Endeavor (Cu-Kα, λ=1.54 Å) equipped with a LynxEye XE-T-position sensitive detector, and XRD data obtained were analyzed to measure the crystalline sizes. In this case, X-ray diffraction analysis conditions and a data processing method were the same as described above. Measurement results are presented in Table 1 below.

TABLE 1

| | Average particle diameter of primary particles (μm) | Crystalline size (μm) |
|---|---|---|
| Example 1 | 0.6 | 108 |
| Example 2 | 0.7 | 115 |
| Comparative Example 1 | 0.5 | 97 |
| Comparative Example 2 | 0.4 | 167 |
| Comparative Example 3 | 0.3 | 88 |
| Comparative Example 4 | 0.5 | 173 |
| Comparative Example 5 | 1.2 | 210 |

According to Table 1, with respect to the positive electrode active materials prepared by Examples 1 and 2 in which boron doping was performed and sintering was performed in a temperature range of 760 to 840° C., it may be confirmed that average particle diameters of the primary particles were 0.6 μm or more and crystalline sizes were 160 nm or less. With respect to Comparative Examples 1 and 2 in which the sintering temperatures were outside the range of the present invention even if boron doping was performed, it was shown that average particle diameters of the primary particles and crystalline sizes did not satisfy the ranges of the present invention. Also, with respect to Comparative Example 3 in which the sintering was performed at a low temperature without performing boron doping, it may be confirmed that both average particle diameter of the primary particles and crystalline size of the positive electrode active material were low at less than the ranges of the present invention. With respect to Comparative Example 4 in which the heat treatment was performed at a high temperature without performing boron doping, it may be confirmed that a crystalline size of the positive electrode active material was formed larger than those of Examples 1 and 2, but a primary particle diameter was formed smaller than those of Examples 1 and 2.

With respect to Comparative Example 5, since an excess amount of boron was included to further reduce the reactivity between the precursor and the lithium raw material, the positive electrode active material was over-sintered, and thus, it may be confirmed that both primary particle diameter and crystalline size exceeded the ranges of the present invention.

EXPERIMENTAL EXAMPLE 2

High-Temperature Life Characteristics

Secondary batteries were prepared by using the positive electrode active materials prepared in Examples 1 and 2 and Comparative Examples 1 to 5, and high-temperature characteristics were evaluated for each of the secondary batteries including the positive electrode active materials of Examples 1 and 2 and Comparative Examples 1 to 5.

First, each of the positive electrode active materials prepared in Examples 1 and 2 and Comparative Examples 1 to 5, a conductive agent, and a binder were mixed in an N-methylpyrrolidone (NMP) solvent at a weight ratio of 92:3:4 to prepare a positive electrode slurry. A 20 μm thick aluminum foil was coated with the positive electrode slurry, dried at 130° C., and then rolled to prepare a positive electrode.

A negative electrode active material, a conductive agent, and a binder were mixed at a weight ratio of 96:1.1:2.9 and added to distilled water, as a solvent, to prepare a negative electrode active material slurry. A 10 μm thick copper foil was coated with the prepared slurry, dried, and then roll-pressed to prepare a negative electrode.

Each lithium secondary battery was prepared by preparing an electrode assembly by disposing a separator between the positive electrode and negative electrode prepared as described above, disposing the electrode assembly in a battery case, and then injecting an electrolyte solution into the case. In this case, vinylene carbonate (VC) was injected such that an amount of the VC was 2 wt % based on 100 parts by weight of a total weight of the electrolyte solution, in which 1 M $LiPF_6$ was dissolved in an organic solvent in which ethylenecarbonate (EC):dimethyl carbonate (DMC): diethyl carbonate (DEC) were mixed in a ratio of 1:2:1, to prepare the lithium secondary batteries according to Examples 1 and 2 and Comparative Examples 1 to 5.

Each of the lithium secondary batteries including the positive electrode active materials of Examples 1 and 2 and Comparative Examples 1 to 5 was charged at a constant current of 0.5 C to 4.2 V at 45° C. and cut-off charged at 0.05 C, and was subsequently discharged at a constant current of 0.5 C to 3.0 V.

The charging and discharging behaviors were set as one cycle, and, after this cycle was repeated 400 times, capacity retentions at 45° C. of the lithium secondary batteries of Examples 1 and 2 and Comparative Examples 1 to 5 were derived, and the results thereof are presented in the following Table 2.

TABLE 2

| | Capacity retention in 400th cycle (%) |
|---|---|
| Example 1 | 93.9 |
| Example 2 | 91.3 |
| Comparative Example 1 | 83.9 |
| Comparative Example 2 | 90.2 |
| Comparative Example 3 | 88.7 |
| Comparative Example 4 | 85.1 |
| Comparative Example 5 | 77.5 |

As illustrated in Table 2, it may be confirmed that capacity retentions according to high-temperature cycles of the secondary batteries using the positive electrode active materials prepared in Examples 1 and 2 were more improved than those of the secondary batteries of Comparative Examples 1 to 5.

EXPERIMENTAL EXAMPLE 3

High-Temperature Storage Characteristics

Storage characteristics at a high temperature of the secondary batteries of Examples 1 and 2 and Comparative Examples 1 to 5, which were prepared in Experimental Example 2, were measured.

Specifically, each of the secondary batteries of Examples 1 and 2 and Comparative Examples 1 to 5 was fully charged to 4.2 V and then stored at 60° C. for 4 weeks.

Before the storage, discharge capacity and volume of each fully-charged secondary battery were measured.

After 4 weeks, the stored secondary battery was charged at a constant current of 0.5 C to 4.2 V and was discharged at a constant current of 0.5 C to 3.0 V, discharge capacity and volume in this case were then measured, and the discharge capacity and volume were compared with the discharge capacity and volume of each secondary battery, which were measured before the storage, to derive capacity retention and volume change rate by calculation. The results thereof are presented in Table 3 below.

TABLE 3

|  | Capacity retention (%) | Volume change rate (%) |
|---|---|---|
| Example 1 | 91.4 | 125 |
| Example 2 | 89.7 | 129 |
| Comparative Example 1 | 80.6 | 162 |
| Comparative Example 2 | 82.5 | 156 |
| Comparative Example 3 | 77.1 | 181 |
| Comparative Example 4 | 76.5 | 189 |
| Comparative Example 5 | 69.4 | 210 |

As illustrated in Table 3, since the secondary batteries of Examples 1 and 2 had better capacity characteristics after high-temperature storage and less volume change than the secondary batteries of Comparative Examples 1 to 5, it may be confirmed that less gas was generated at a high temperature.

The invention claimed is:

1. A positive electrode active material comprising a lithium transition metal oxide which is in a form of a secondary particle formed by aggregation of primary particles, wherein the lithium transition metal oxide is represented by Formula 1, wherein the lithium transition metal oxide has a crystalline size of 160 nm or less and an average particle diameter of the primary particle of 0.6 μm or more:

$$Li_{1+a}Ni_xCo_yM^1_zB_wO_2 \qquad \text{[Formula 1]}$$

wherein, in Formula 1,
    $M^1$ comprises at least one of manganese (Mn), and
    $0 \leq a \leq 0.5$, $0.5 \leq x < 1.0$, $0 < y \leq 0.4$, $0 < z \leq 0.4$, and $0 < w \leq 0.05$,
    wherein the boron (B) is included in an amount of 0.02 part by weight to 0.3 part by weight based on 100 parts by weight of the lithium transition metal oxide.

2. The positive electrode active material of claim 1, wherein the positive electrode active material comprises two types of lithium transition metal oxides having different average particle diameters $D_{50}$ of secondary particles.

3. The positive electrode active material of claim 2, wherein the positive electrode active material comprises a first lithium transition metal oxide having the average particle diameter $D_{50}$ of the secondary particle of 7 μm to 20 μm and a second lithium transition metal oxide having the average particle diameter $D_{50}$ of the secondary particle of 1 μm to 7 μm.

4. A method of preparing a positive electrode active material, the method comprising:

mixing a transition metal hydroxide precursor, a lithium raw material, and a boron (B)-containing raw material and sintering at 760° C. to 840° C. to prepare a boron (B)-doped lithium transition metal oxide, wherein the boron (B)-doped lithium transition metal oxide is represented by Formula 1 and has a crystalline size of 160 nm or less and an average particle diameter of primary particles of 0.6 μm or more:

$$Li_{1+a}Ni_xCo_yM^1_zB_wO_2 \qquad \text{[Formula 1]}$$

wherein, in Formula 1,
    $M^1$ is manganese (Mn), and
    $0 \leq a \leq 0.5$, $0.5 \leq x < 1.0$, $0 < y \leq 0.4$, $0 < z \leq 0.4$, and $0 < w \leq 0.1$,
    wherein the transition metal hydroxide precursor and the boron (B)-containing raw material are mixed in amounts such that a total number of moles of transition metals: a number of moles of boron is in a range of 0.97:0.03 to 0.998:0.002.

5. The method of claim 4, wherein the transition metal hydroxide precursor is represented by Formula 2:

$$Ni_{x1}Co_{y1}M^1_{z1}(OH)_2 \qquad \text{[Formula 2]}$$

wherein, in Formula 2,
    $M^1$ comprises at least one of Mn or Al, and
    $0.5 \leq x1 < 1.0$, $0 < y1 \leq 0.4$, $0 < z1 \leq 0.4$, and $x1+y1+z1=1$.

6. The method of claim 4, wherein the lithium raw material is mixed in an amount such that a ratio of a number of moles of lithium to a total number of moles of transition metals and boron is in a range of 1.0 to 1.2.

7. The method of claim 4, wherein the sintering is performed at 760° C. to 800° C. for 15 hours to 30 hours.

8. A positive electrode for a lithium secondary battery, the positive electrode comprising the positive electrode active material of claim 1.

9. A lithium secondary battery comprising the positive electrode of claim 8.

* * * * *